United States Patent Office 3,397,118
Patented Aug. 13, 1968

3,397,118
PURIFICATION OF CHLOROANILINES
BY VACUUM DISTILLATION WITH A
CHROMATE
Robert D. Gano, Wilmington, Del., assignor to E. I. du Pont de Nemours and Company, Wilmington, Del., a corporation of Delaware
No Drawing. Filed May 4, 1967, Ser. No. 635,996
4 Claims. (Cl. 203—6)

ABSTRACT OF THE DISCLOSURE

Vacuum distillation of chloroanilines with 0.3 to 2.0 weight percent alkali metal chromate or dichromate.

BACKGROUND OF THE INVENTION

Chloroanilines are generally prepared by reduction of the corresponding nitro compound, which in turn was obtained either by nitration of chlorobenzene or by chlorination of nitrobenzene. It is often desirable to purify the product by distillation. A problem encountered in this distillation is the decomposition of the chloroaniline to form tars. Another problem is that the distilled product is instable and undergoes degradation forming insoluble tars resulting in a change in color.

Prior art methods to overcome the tar formation problem have been the addition to the distillation mixture of soda ash or a polyalkylene polyamine as shown in U.S. Patent 2,911,340.

The process of this invention overcomes the problem of the distilled product undergoing further tar formation on storage and produces a pure, stable chloraniline.

SUMMARY OF THE INVENTION

A process for the purification of chloroanilines which comprises distilling under vacuum the aniline in the presence of alkali metal chromate or dichromate. The amount of the chromate or dichromate employed is from about 0.3 to 2.0 weight percent based upon the weight of the aniline. The substantially pure chloroaniline is recovered.

DESCRIPTION OF THE INVENTION

The chloroaniline which is to be purified by the process of this invention may be obtained by catalytic hydrogenation of the corresponding chloronitrobenzene. The crude chloroaniline product is separated from the reduction reaction mass and is placed into a vessel suitable for vacuum distillation, that is, a steel or other metal or glass-lined vessel, and the alkali metal chromate or dichromate is added.

The alkali metal, M, in the chromate, $M_2CrO_4$, or dichromate, $M_2Cr_2O_7$, may be sodium or potassium. The amount of chromate or dichromate effective in the practice of this invention is from about 0.3 to 2.0 weight percent based on the weight of the crude substituted aniline. The chromate or dichromate may be added as an aqueous solution or as the solid.

The mixture of chloroaniline and alkali metal chromate or dichromate is heated to about 150° C. to remove any water present. It is then cooled and subjected to vacuum distillation. The distillation temperature is about 90° C. to 150° C. under reduced pressure of from 10 to 20 mm. Hg. The distillate consists of substantially pure chloroaniline.

The aniline employed in the present invention may be any aniline substituted by at least one chloro group. While ortho, meta and para chloroaniline and 3,4-dichloroaniline may be purified by the process of this invention, the aniline preferred in the practice of this invention is 2,5-dichloroaniline.

In a preferred embodiment of this invention, there is added to the chloraniline mixture prior to distillation a polyalkylene polyamine of the formula $$H_2N-(CH_2CH_2NH)_nH$$

where $n$ is an integer from 3 to 4, that is, triethylenetetramine or tetraethylenepentamine, and soda ash or potassium carbonate, as described in U.S. Patent 2,911,340.

Chloroanilines tend to discolor on exposure to air. To inhibit this discoloration, a small amount of hydrazine hydrate is added to the purified chloroaniline product as described in British Patent 1,047,607, published November 9, 1966.

Representative examples illustrating the present invention follow.

Example 1

Approximately 15,000 lb. of molten crude 2,5-dichloroaniline, obtained by the catalytic hydrogenation of crude 2,5-dichloronitrobenzene, were added to the boiler of a vacuum still at about 60° to 80° C. An aqueous solution was prepared by dissolving 75 lb. of tetraethylenepentamine, 300 lb. of sodium dichromate ($Na_2Cr_2O_7 \cdot 2H_2O$) and 150 lb. of sodium carbonate in 750 lb. of water. The aqueous solution was added to the molten 2,5-dichloroaniline in the vacuum still boiler. This mixture was heated at atmospheric pressure to about 150° C. to distill the water. The dehydrated mixture was cooled to about 90° C. and vacuum was applied to remove the last traces of water. The crude amine was then fractionally distilled through an ordinary packed distillation column to separate it from a small amount of lower-boiling dechlorination products, such as o- and m-chloroanilines, leaving a residue of organic and inorganic impurities in the still boiler. The 13,500 lb. of colorless distillate were inhibited against discoloration due to exposure to air by the addition of about 0.1% of 85% hydrazine hydrate solution. Flakes of this purified 2,5-dichloroaniline were stored for one month at 40° to 45° C. with minimal discoloration to very light tan flakes containing only 0.01%, or less, of dark residue insoluble in warm 5% HCl.

Example 2

When the purification, described in Example 1, above, was repeated omitting the addition of sodium dichromate, tetraethylenepentamine and sodium carbonate, the initially colorless distillate, containing 0.1% hydrazine hydrate solution, quickly darkened at 45° C., turning to a light greyish-brown flake in seven days and forming black degradation impurities amounting to 0.08% insolubles in warm 5% HCl after 28 days exposure to air at 40° to 45° C.

Example 3

Crude 2,5-dichloroaniline was treated in a vacuum still boiler with 2% by weight of commercial-grade sodium chromate crystals ($Na_2CrO_4 \cdot 4H_2O$), added to the molten amine at 90° C. in 0.25% weight portions at fifteen-minute intervals without mechanical agitation. The vacuum-distilled and flaked 2,5-dichloroaniline, inhibited against rapid air oxidation with 0.1% of 85% hydrazine hydrate solution, only darkened to a light-amber color, 0.01% acid-insoluble impurities, after 42 days storage in air at 40° to 45° C.

Example 4

Example 3 was repeated, substituting 2% by weight of commercial sodium dichromate crystals, $$(Na_2Cr_2O_7 \cdot 2H_2O)$$

for the sodium chromate. The purified 2,5-dichloroaniline flakes were of equivalent stability.

Example 5

Example 3 was repeated, substituting ordinary, unstable, vacuum-distilled 2,5-dichloroaniline for crude 2,5-dichloroaniline. Only 0.25% by weight of sodium dichromate crystals was necessary to obtain a vacuum redistilled, oxidation inhibited 2,5-dichloroaniline of suitable stability.

Example 6

When Example 3 was repeated with crude 2,5-dichloroaniline, adding 1% weight of sodium carbonate after 2% by weight of sodium dichromate crystals had been added to the molten crude amine, the colorless distilled oxidation-inhibited and flaked 2,5-dichloroaniline was slightly more stable than the 2,5-dichloroaniline flakes obtained in Example 3. After 39 days exposure to air at 40° to 45° C., these flakes were light yellow in color and there was no increase in the negligible amount (<0.01%) of acid-insoluble degradation tar.

The process of this invention may also be applied to the purification of 5-methyl-ortho-anisidine which is aniline substituted with a methyl and a methoxy group. Examples 6 and 7 illustrate the distillation of 5-methyl-ortho-anisidine in the presence of alkali metal chromate or dichromate.

Example 7

When fresh, light-colored crude 5-methyl-ortho-anisidine, obtained by the catalytic hydrogenation of crude 3-nitro-4-methoxy-toluene, was vacuum distilled to separate it from water and residue, the initially light colored distillate darkened rapidly after flaking and storing it at 40° to 45° C. for 30 days, forming 0.81% black residue insoluble in weak aqueous hydrochloric acid. When the same fresh distillate was inhibited against air oxidation by the addition of 0.1% weight of 85% hydrazine hydrate solution, its flakes darkened at a slower, but unacceptable rate. After similar accelerated storage tests these 5-methyl-o-anisidine flakes contained 0.08% of insoluble degradation tars.

When this purification was repeated with 0.5% of commercial tetraethylenepentamine and 1% weight of sodium carbonate added to the molten crude 5-methyl-ortho-anisidine before distillation, the distilled anisidine flakes also darkened, but less rapidly, forming 0.20% insolubles after 30 days' storage at 40° to 45° C. without hydrazine hydrate added, or 0.15% insolubles if the oxidation inhibitor had been added after distillation.

Example 8

When the purification of Example 7 was repeated with sodium chromate or dichromate, the oxidation-inhibited flaked 5-methyl-ortho-anisidine was more stable, as illustrated in the following table:

STABILITY OF PURIFIED 5-METHYL-ORTHO-ANISIDINE

| Test | Added to Vacuum Still Boiler | | Quality of Distilled, Inhibited* and Flake Anisidine Stored 28-35 Days at 40°-45° C. | |
|---|---|---|---|---|
| | Cpd. | Wt. percent based on Anisidine Crude | Treating Temp., ° C. | Percent Insolubles in 5% HCl |
| 1 | Sodium Dichromate | 2 | 90° C., 1 hour | <0.01-0.01 |
| | Na$_2$CO$_3$ | 1 | | |
| | Tetraethylenepentamine | 0.5 | | |
| | Water | 5 | | |
| 2 | Sodium Dichromate | 2 | 90° C., 1 hour | <0.01 |
| 3 | Sodium Dichromate | 0.3 | 150° C., 1 hour | 0.03 |
| | Water | 3 | | |
| 4 | Sodium Dichromate | 0.3 | 150° C., 1 hour | 0.01 |
| | Tetraethylenepentamine | 0.5 | | |
| | Water | 3 | | |
| 5 | Sodium Dichromate | 0.3 | 100° C.,-240° C. | 0.01 |
| | Tetraethylenepentamine | 0.5 | | |

*Inhibited by addition of 0.1% by weight of 85% hydrazine hydrate solution.

It is to be understood that the preceding examples are representative and that said examples may be varied within the scope of the total specification, as understood by one skilled in the art, to produce essentially the same results.

As many widely different embodiments of this invention may be made without departing from the spirit and scope thereof, it is to be understood that this invention is not limited to the specific embodiments thereof, except as defined in the appended claims.

I claim:

1. A process for the purification of chloroaniline which comprises distilling chloroaniline under vacuum in the presence of from 0.3 to 2.0 weight percent of an alkali metal chromate or alkali metal dichromate, based on the weight of the chloroaniline and recovering the substantially pure chloroaniline.

2. The process of claim 1 in which the chloroaniline is 2,5-dichloroaniline.

3. The process of claim 1 in which the distillation is carried out in the presence of a polyalkylene-polyamine of the formula H$_2$N—(CH$_2$CH$_2$NH)$_n$H, where $n$ is an integer from 3 to 4.

4. Process of claim 3, wherein hydrazine hydrate is added to the distilled chloroaniline.

References Cited

UNITED STATES PATENTS 2,187,820    1/1940    Lecher et al. ———————— 203—33
2,911,340    11/1959    Franklin et al. ———————— 203—8
2,946,822    7/1960    Schenck et al.

WILBUR L. BASCOMB, JR., *Primary Examiner.*